(12) United States Patent
Yoshida

(10) Patent No.: US 7,170,272 B2
(45) Date of Patent: Jan. 30, 2007

(54) SEMICONDUCTOR INTEGRATED CIRCUIT FOR CONTROLLING POWER SUPPLY, AN ELECTRONIC COMPONENT AND A POWER SUPPLY DEVICE

(75) Inventor: Shinichi Yoshida, Musashisakai (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/289,484

(22) Filed: Nov. 30, 2005

(65) Prior Publication Data

US 2006/0113980 A1  Jun. 1, 2006

(30) Foreign Application Priority Data

Nov. 30, 2004  (JP) .............................. 2004-345189

(51) Int. Cl.
  *G05F 1/618* (2006.01)
(52) U.S. Cl. ...................... 323/284; 323/224; 323/285
(58) Field of Classification Search .............. 323/222, 323/224, 282–285, 351
  See application file for complete search history.

(56) References Cited

U.S. PATENT DOCUMENTS 5,912,552 A * 6/1999 Tateishi ...................... 323/285
6,307,356 B1 * 10/2001 Dwelley ..................... 323/282
6,476,589 B2 * 11/2002 Umminger et al. ......... 323/282
7,061,218 B2 * 6/2006 Ito ............................. 323/351
7,098,632 B2 * 8/2006 Chen et al. ................. 323/222

FOREIGN PATENT DOCUMENTS

| JP | 11-187651 | 7/1999 |
| JP | 2000-092824 | 3/2000 |
| JP | 2004-056992 | 2/2004 |

* cited by examiner

*Primary Examiner*—Gary L Laxton
(74) *Attorney, Agent, or Firm*—Mattingly, Stanger, Malur & Brundidge, P.C.

(57) ABSTRACT

A semiconductor integrated circuit for controlling power supply which has a function of preventing a reverse current flowing in a coil under a light load condition and ensures good response of output voltage to load variation. In a synchronous rectification switching regulator having a reverse current detection circuit which can detect a reverse current flowing in an inductor (coil) and a reverse current prevention function, when a prescribed time has elapsed after detection of a reverse current based on a detection signal from the reverse current detection circuit or after the number of times of reverse current detection has reached a prescribed value, the reverse current prevention function is activated to turn Off a synchronous rectification switching device.

10 Claims, 7 Drawing Sheets

SEMICONDUCTOR INTEGRATED CIRCUIT FOR CONTROLLING POWER SUPPLY, AN ELECTRONIC COMPONENT AND A POWER SUPPLY DEVICE

CROSS-REFERENCE TO RELATED APPLICATION

The present application claims priority from Japanese patent application No. 2004-345189 filed on Nov. 30, 2004, the content of which is hereby incorporated by reference into this application.

BACKGROUND OF THE INVENTION

The present invention relates to technology for improving conversion efficiency of synchronous rectification DC-DC converters and further to technology whereby in a switching regulator with a reverse current prevention function for detecting a reverse current and controlling a transistor for synchronous control, power loss is reduced while the reverse current prevention function is working and conversion efficiency is thus improved, and more specifically to technology which is effective for a semiconductor integrated circuit for controlling a switching regulator, and an electronic component for power supply (power supply module) and a power supply device which incorporate the same.

One type of DC-DC converter is a synchronous rectification switching regulator. In the synchronous rectification switching regulator, a main switching device is provided in a path in which current flows from a power supply to a load through a coil (inductor) and the current to the load is controlled by turning on or off this switching device and also a synchronous rectification switching device is provided between the node of connection of the main switching device and the coil and the ground (grounding point) and power loss is reduced by turning it on or off complementarily to the main switching device.

This synchronous rectification switching regulator has a problem that, although power loss is small when the load is relatively heavy, power loss is large when the load is light. This is because while the load is heavy, a positive current, or current to the load, flows in the coil but while it is light, the direction of the current flowing in the coil is reversed and a negative current (reverse current), or current which flows through the synchronous rectification switching device to the ground is generated, resulting in power loss. In order to reduce power loss due to such a reverse current, an invention has been proposed in which a light load condition which could cause a reverse current to flow in the coil is detected and the synchronous rectification switching device on the ground side is turned Off upon such detection (for example, Patent Document 1: Japanese Unexamined Patent Publication No. 2000-092824).

SUMMARY OF THE INVENTION

In recent years, as an increasing number of electronic apparatuses incorporate a microprocessor as a system controller, there has been a growing tendency that the operating frequency is increased to enhance the performance of the microprocessor (hereinafter referred to as CPU). Also in order to reduce consumption current and lengthen the battery life, the voltage supplied to the CPU tends to decrease. As a consequence, the maximum operating current increases as the operating frequency becomes higher and the supply voltage becomes lower.

In addition, many mobile electronic apparatuses which incorporate a CPU employ a system which increases or decreases the battery voltage by a switching regulator before supplying operating current to the CPU. In this case, how the battery life can be lengthened is important and therefore the recent trend is that, for longer battery life, the system is designed as follows: when the CPU need not run, the CPU circuitry, in whole or in part, is stopped to let the CPU enter its low consumption current state (standby mode). This means that the CPU consumption current varies widely and the variation range tends to increase as the CPU maximum operating current becomes larger.

On the other hand, it is desirable for the power supply for the CPU to feature: high efficiency at low voltage, large current output; excellent transient response; and high efficiency under a light load condition. For high efficiency at low voltage, large current output, a synchronous rectification switching regulator is suitable. In order to satisfy the requirement for high efficiency under a light load condition, a regulator with a reverse current prevention function is suitable. However, a regulator with a reverse current prevention function like the one disclosed in Patent Document 1 (Japanese Unexamined Patent Publication No. 2000-092824) has a drawback that its efficiency is high under a light load condition but upon detection of a reverse current the synchronous rectification switching device on the ground side is turned Off and thus the output voltage does not go down quickly, resulting in poor output response to variation of the load.

For a synchronous rectification DC-DC converter with a function of preventing a reverse current from flowing in an inductor under a light load condition, an invention which improves the response characteristic in a transient state in which output power rapidly decreases has been proposed (Patent Document 2, Japanese Unexamined Patent Publication No. 2004-056992).

The invention disclosed by Patent Document 2 has a circuit for detecting a rapid decrease in output power, where the circuit compares output voltage Vo with upper limit output voltage E1, higher by a prescribed voltage than target output voltage E0, and outputs the result of comparison so that if output voltage Vo is higher than upper limit output voltage E1, the reverse current prevention function is stopped, namely a normal synchronous rectification control mode, in which the synchronous rectification switching device is turned On, is continued, thereby shortening the time for output voltage Vo to reach target output voltage E0.

However, the invention described in Patent Document 2 has a problem that as shown in FIG. 7(A), if output voltage Vo becomes higher than target output voltage E0 and lower than upper limit output voltage E1 due to load variation, the reverse current prevention function is activated and the time for output voltage Vo to reach target output voltage E0 becomes longer, and as shown in FIG. 7(B), if output voltage Vo becomes higher than upper limit output voltage E1, the reverse current prevention function is once stopped but as it goes down to upper limit output voltage E1, the reverse current prevention function is activated and the time for output voltage Vo to reach target output voltage E0 is not so shortened.

Besides, the reverse current prevention circuit in the invention disclosed in Patent Document 2 has a problem that while the reverse current prevention function is working, the low-side synchronous rectification switching device is completely turned Off, which causes a current to flow to the coil through a parasitic diode in the device, leading to power loss and lower efficiency. More specifically, even when, under a light load condition, the reverse current prevention function is activated and the low-side synchronous rectification switching device is turned Off completely, the high-side switching device turns On from time to time to compensate for a current to the load and, as shown in FIG. 7(C) in enlarged form, the current in coil IL increases as the high-side switching device turns On. Even if the high-side switching device is turned Off later, the current tries to continue flowing to the coil and it flows through the parasitic diode in the synchronous rectification switching device, causing power loss which corresponds to the hatching in the figure.

An object of the present invention is to provide a semiconductor integrated circuit for controlling power supply as a constituent of a synchronous rectification switching regulator which has a function of preventing a reverse current to a coil (inductor) under a light load condition and ensures good response of output voltage to load variation and a power supply module and a power supply device which use the same.

Another object of the present invention is to provide a semiconductor integrated circuit for controlling power supply as a constituent of a synchronous rectification switching regulator which features less power loss even with large load variation and high efficiency, and a power supply module and a power supply device which use the same.

The above and further objects and novel features of the invention will more fully appear from the following detailed description in this specification and the accompanying drawings.

According to the invention, in a synchronous rectification switching regulator having a reverse current detection circuit which can detect a current flowing in a reverse direction in an inductor (coil) and a reverse current detection function, when a prescribed time has elapsed after detection of a reverse current according to a detection signal from the reverse current detection circuit or after the number of times of reverse current detection has reached a prescribed value, the reverse current prevention function is activated to turn Off a synchronous rectification switching device (or a synchronous rectification switching element). Also control is performed so that when the reverse current prevention function is activated, a forward current flows in the inductor with a main switching device (or a main switching element) On and even after it turns Off, the synchronous rectification switching device is On while the forward current is flowing.

According to the above means, the reverse current detection function does not work immediately after a reverse current is detected, so that output voltage response is improved; also when a prescribed time has elapsed after detection of a reverse current or after the number of times of reverse current detection has reached a prescribed value, the reverse current prevention function is activated, so that under a light load condition, power loss which occurs because the synchronous rectification switching device turns On and a reverse current flows to the ground is reduced. In addition, while the reverse current prevention function is working, a current flow through a parasitic diode in the synchronous rectification switching device is prevented, thereby reducing power loss.

Preferably, the reverse current detection circuit consists of a comparator which compares the potential of the node of connection of the main switching device and inductor with a prescribed reference voltage and decides the direction of current, and also an overvoltage detection circuit having a comparator which compares output voltage with a reference voltage or an error amplifier which outputs a voltage depending on the potential difference between them should be provided where, when the output voltage becomes higher than a prescribed upper limit voltage, the reference voltage applied to the comparator of the reverse current detection circuit is changed by output of the overvoltage detection circuit to increase the reverse current detection voltage.

Consequently, when the output voltage becomes higher than the prescribed upper limit voltage, the reverse current prevention function does not work even if there is some reverse current, namely activation of the reverse current prevention function is delayed so as to prevent the switching device from being destroyed by a voltage rise resulting from a regenerative current in the inductor returning to an input power supply.

In a switching regulator with an overvoltage detection circuit, when an overvoltage is detected, the synchronous rectification switching device may be turned On immediately. However, if that is the case, it can happen that the synchronous rectification switching device is destroyed because a current flows in it continuously, or a large reverse current flows without limitation and at the instant that the synchronous rectification switching device turns Off, a large current returns to the input power supply due to the regenerative current in the coil and if the input power supply has no sink capacity, the voltage rises and exceeds the withstand voltage of the device in use and destroys the device. By contrast, according to the present invention, even when the output voltage is higher than the upper limit voltage, merely the reverse current detection voltage is changed and switching control continues for a while after detection of a reverse current and then the reverse current prevention circuit works, so that a large reverse current does not flow to the input power supply and there is no chance of destroying the switching device.

Advantageous effects which are typically brought about by the present invention are briefly outlined below.

It is possible to configure a synchronous rectification switching regulator which detects a reverse current flowing in a coil, reduces power loss under a light load condition, and features good output voltage response to load variation consequently realizing a mobile electronic apparatus which can be battery-driven for a long time even when the load varies largely with less power loss in power supply and less battery exhaustion.

BRIEF DESCRIPTION OF THE DRAWINGS

FIGS. 7(A), 7(B) and 7(C) show a conventional switching regulator, in which FIG. 7(A) is a timing diagram showing transient response characteristics where the output voltage of the conventional switching regulator is higher than a target voltage and lower than an upper limit voltage, FIG. 7(B) is a timing diagram showing transient response characteristics where the output voltage of the conventional switching regulator is higher than an upper limit voltage, and FIG. 7(C) is an enlarged waveform diagram showing change in coil current in the conventional switching regulator while the reverse current prevention function is working; and FIG. 8(A), FIG. 8(B) and FIG. 8(C) show a switching regulator according to the present invention, in which FIG. 8(A) is a timing diagram showing transient response characteristics where the output voltage of the switching regulator according to the present invention is higher than a target voltage and lower than a hypothetical upper limit voltage, FIG. 8(B) is a timing diagram showing transient response characteristics where the output voltage of the switching regulator according to the present invention is higher than a hypothetical upper limit voltage, and FIG. 8(C) is an enlarged waveform diagram showing change in coil current in the switching regulator according to the present invention while the reverse current prevention function is working.

DETAILED DESCRIPTION OF THE PREFERRED EMBODIMENTS

Next, preferred embodiments of the present invention will be described referring to the accompanying drawings.

Figure 1:
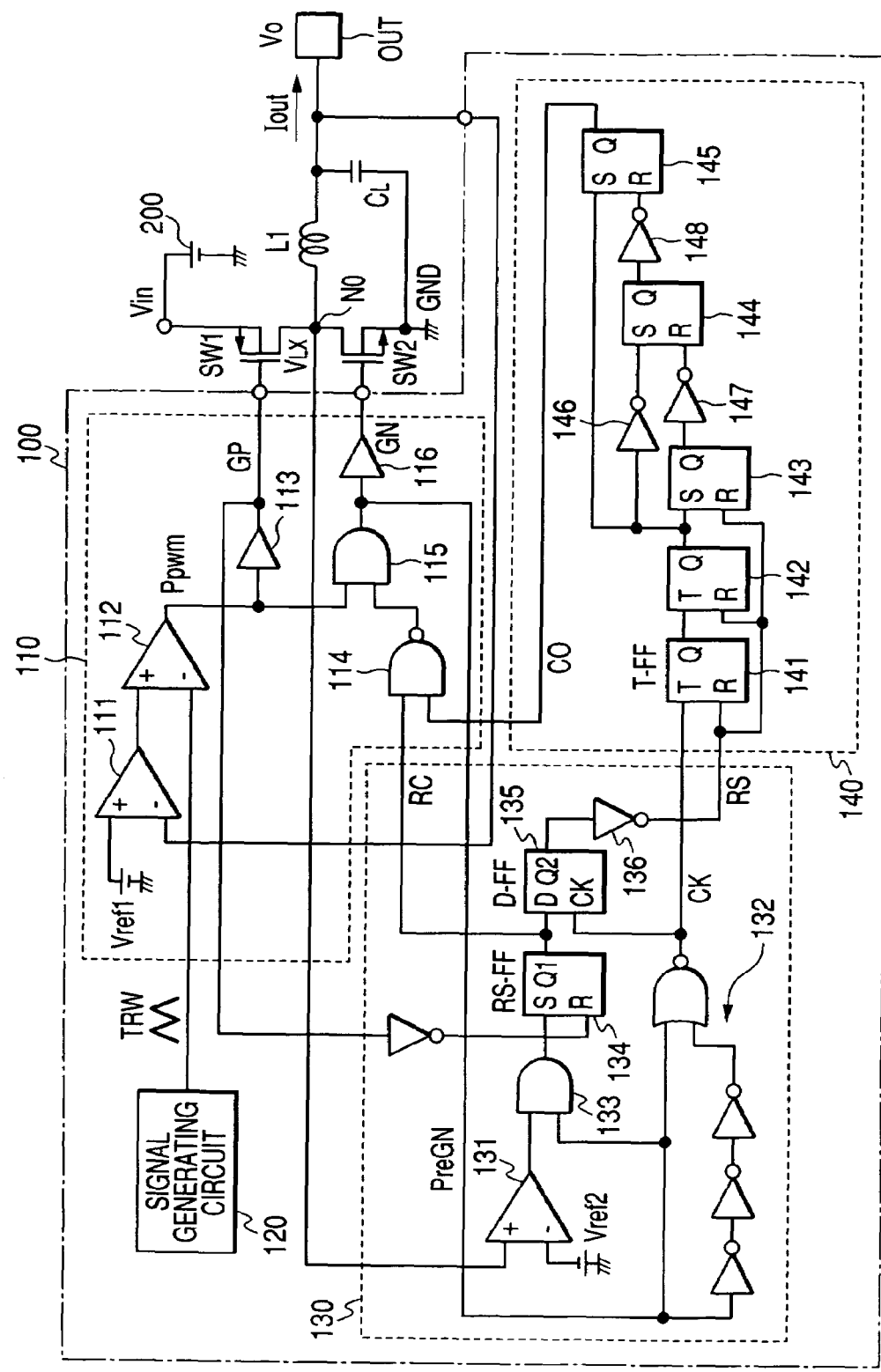
FIG. 1 is a block diagram showing the circuit configuration of a step-down switching regulator according to an embodiment of the invention.

FIG. 1 shows a semiconductor integrated circuit for controlling power supply according to an embodiment of the invention and a step-down switching regulator which uses the same. In FIG. 1, a circuit area, as represented by an area enclosed by chain line 100, is a semiconductor integrated circuit for controlling power supply, which is formed on a semiconductor chip made of, for example, monocrystal silicon. Devices other than the circuit 100 which are SW1, SW2, L1, and CL consist of discrete components, and the above semiconductor chip and the discrete components are mounted over an insulating substrate or in a package to constitute a module.

In this specification, a module refers to a structure which can be handled as a single electronic component where it has an insulating substrate (for example, a ceramic substrate) with printed wires on or inside it and plural semiconductor chips and discrete components are mounted on it and the components are connected by the printed wires or bonding wires so as to perform their respective functions. As shown in FIG. 1, along with the circuit as enclosed by the chain line 100, switching devices SW1 and SW2 (except L1 and CL) may be formed over a single semiconductor chip to constitute a semiconductor integrated circuit.

The switching regulator in this embodiment is composed of: the above semiconductor integrated circuit for controlling power supply 100; switching devices SW1 and SW2 as power MOSFETs connected in series between voltage input terminal Vin for receiving DC voltage input from a battery 200 and a grounding point (reference potential terminal) GND; an inductor L1 connected between the node of connection of the switching devices SW1 and SW2 and an output terminal OUT; and a smoothing capacitor CL connected between the output terminal OUT and the grounding point.

The semiconductor integrated circuit for controlling power supply 100 includes: a switching control circuit 110 for generating a signal (PWM control pulse) which is sent to the gates of the switching devices SW1 and SW2 to turn them On or Off; a signal generating circuit 120 which generates a triangular wave signal TRW with a prescribed frequency necessary for PWM control pulse generation; a reverse current detection circuit 130 which detects a reverse current from the inductor L1 to the ground potential GND; and a reverse current prevention holding circuit 140 which consists of a counter.

In this embodiment, though not so limited, the high-side switching device SW1 is a p-channel MOSFET and the low-side switching device SW2 is an n-channel MOSFET. When these switch MOSFETs SW1 and SW2 are separate from the semiconductor integrated circuit 100 including the switching control circuit 110, SW1 and SW2 may be separate components (power MOSFETs) or in the form of a commercially available IC package in which a p-channel MOSFET and an n-channel MOSFET are encapsulated.

The switching control circuit 110 is composed of: an error amplifier 111 which compares output voltage Vo with reference voltage Vref1 and outputs a voltage depending on the potential difference; a PWM comparator 112 which compares output voltage of the error amplifier 111 with triangular wave signal TRW from the signal generating circuit 120 and generates PWM control pulse Ppwm with a pulse width depending on the potential difference; a buffer 113 which supplies output of the comparator 112 to the gate terminal of the high-side switching device SW1; an NAND gate circuit 114 which performs logical multiplication of output signal RC from the reverse current detection circuit 130 and output signal CO from the reverse current prevention holding circuit 140; an AND gate circuit 115 which performs logical multiplication of output of the NAND gate circuit 114 and output of the comparator 112; and a buffer 116 which transmits change in output of the AND gate 115 to the gate terminal of the low-side switching device SW2.

Because the switching device SW1 is a p-channel MOSFET and SW2 is an n-channel MOSFET, SW1 and SW2 are turned On and Off in a complementary manner by PWM control pulse Ppwm from the PWM comparator 112, namely when one of them is On, the other is Off, and the buffers 113 and 116 and the AND gate circuit 115 generate gate control signals GP and GN including dead time for preventing both the switching devices SW1 and SW2 from turning On at the same time and causing a through current flow and give the signals to SW1 and SW2.

The PWM comparator 112 compares triangular wave signal TRW with a prescribed frequency from the signal generating circuit 120 with the feedback output voltage Vo and generates a pulse; therefore, as output voltage Vo goes down, the pulse width of the output pulse becomes wider and as output voltage Vo goes up, the pulse width of the output control pulse becomes narrower. In other words, the duty ratio of PWM control pulse Ppwm varies depending on the level of output voltage Vo and as output voltage Vo goes down, the On time of the high-side switching device SW1 becomes longer and as output voltage Vo goes up, the On time of the low-side switching device SW2 becomes longer so that output voltage Vo is maintained almost constant.

The reverse current detection circuit 130 is composed of: a comparator 131 for reverse current detection which compares potential VLX of the node N0 of connection of the switching devices SW1 and SW2, connected with an inductor L1, with reference voltage Vref2; a one-shot pulse generating circuit 132 which detects a falling edge of output GN of the AND gate 115 and generates a clock pulse CK; an AND gate circuit 133 which performs logical multiplication of output of the comparator 131 and output GN of the AND gate 115; an RS flip flop 134 which is set by output of the AND gate circuit 133 and reset by a signal obtained by inversion of output GP of the buffer 113; a D type flip flop 135 which receives output of the flip flop 134 through its data input terminal and gets input through output clock CK from the one-shot pulse generating circuit 132; and an inverter 136 which inverts output of the flip flop 135 and supplies it as a reset signal RS to the reverse current prevention holding circuit 140.

The reverse current prevention holding circuit 140, which includes cascade-connected flip flops 141 to 145 and inverters 146 to 148, constitutes a counter circuit in which output CO goes high as it counts four successive output clocks CK from the one-shot pulse generating circuit 132. Also the reverse current prevention holding circuit 140 receives an inverted output of the flip flop 135 of the reverse current detection circuit 130 as a reset signal RS; when output of the flip flop 135 goes high before receiving four successive clocks CK, the circuit is reset before output CO goes high and again it starts counting clocks CK from zero, and when output CO goes high, then output of the flip flop 135 goes high, it is once reset and prepared to detect a next reverse current.

When output CO of the reverse current prevention holding circuit 140 goes high, the NAND gate circuit 114 of the switching control circuit 110 opens and output (reverse current detection signal RC) of the flip flop 134 of the reverse current detection circuit 130 is supplied to the AND gate circuit 115 to close the gate, so that even if PWM control pulse Ppwm comes from the comparator 112, it is not sent to the low-side switching device SW2, which holds SW2 Off and thereby prevents a reverse current from the coil from flowing to the ground.

Next, how the switching regulator in the above embodiment works when load on it suddenly changes to a large extent will be explained referring to the timing diagram in FIG. 2.

Figure 2:
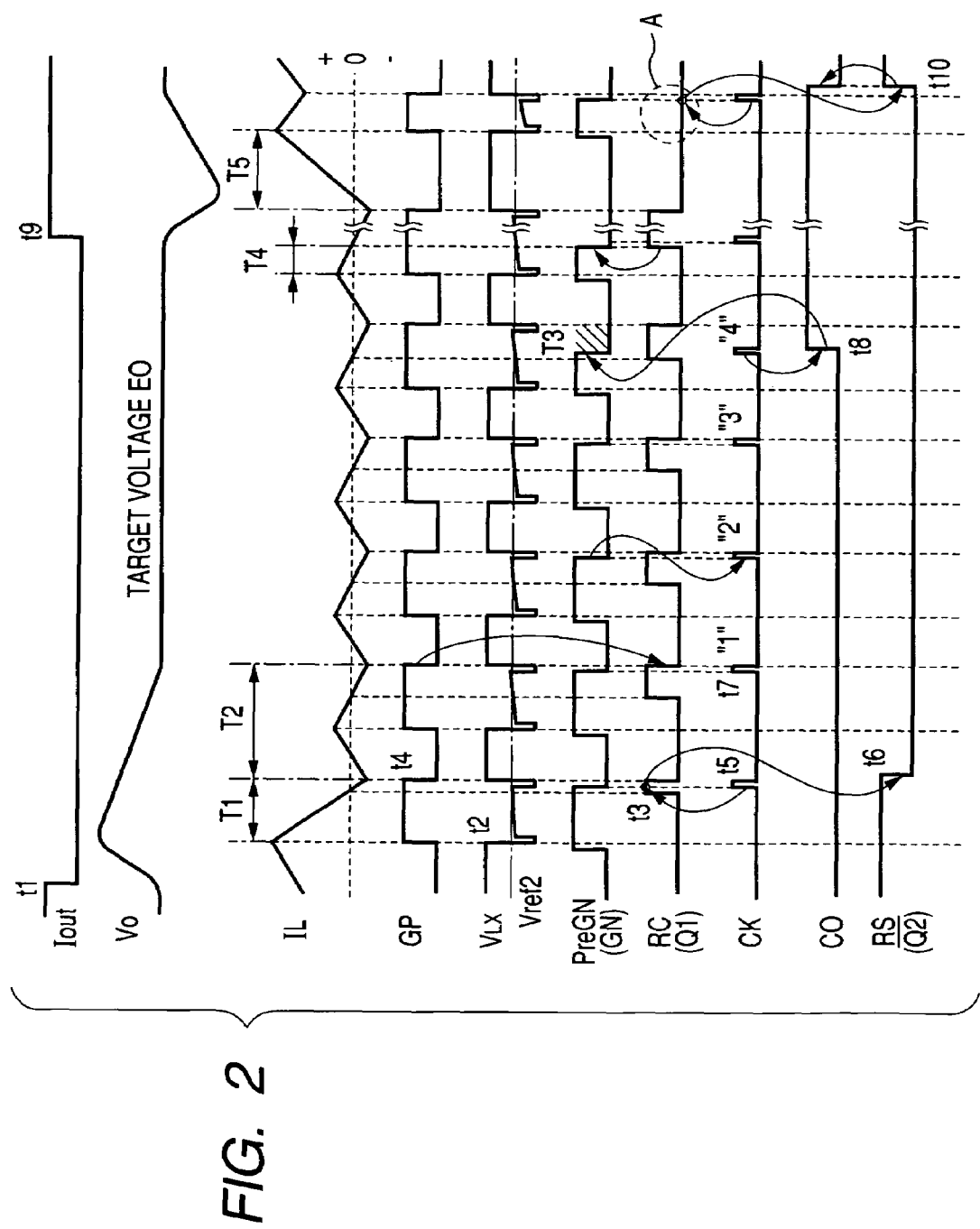
FIG. 2 is a timing diagram showing signal timing in the switching regulator according to the embodiment.

Referring to FIG. 2, when output current Iout suddenly becomes small at time t1 for such a reason that the CPU which receives supply voltage from the switching regulator enters a sleep mode, output voltage Vo goes up. Because of this, output of the error amplifier 111 goes down; the pulse width of PWM control pulse Ppwm from the switching control circuit 110 becomes wider; the On time of the high-side switching device SW1 decreases and the On time of the low-side switching device SW2 increases; and current IL which flows in the coil decreases (time period T1). Here, at the same time when the high-side switching device SW1 turns Off, potential VLX of the node NO suddenly drops (time t2).

Then, as potential VLX gradually rises and turns positive, a current (reverse current) flows from the node NO to the ground through the low-side switching device SW2. At this moment, the comparator 131 of the reverse current detection circuit 130 detects the reverse current; and when potential VLX of the node NO becomes higher than reference voltage Vref2 (time t3), output of the comparator 131 changes and the RS flip flop 134 is set and its output RC goes high. Then the flip flop 134 is reset by a signal obtained by inversion of gate signal GP of the switching device SW1 and its output RC is synchronized with a falling edge of gate signal GP of the switching signal SW1, namely a falling edge of PWM pulse Ppwm, and goes low (time t4).

On the other hand, in the reverse current detection circuit 130, the one-shot pulse generating circuit 132 generates a clock CK synchronously with a rising edge of PWM pulse Ppwm, namely a falling edge of gate signal PreGN of the switching device SW2 (time t5). Then, through this clock CK, the flip flop 135 gets output Q1 of the flip flop 134 and its output Q2 goes high and output RS of the inverter 136 goes low, thereby canceling the reset state of the reverse current prevention holding circuit 140 (time t6).

In the next period T2, according to PWM control pulse Ppwm from the switching control circuit 110, the above operation sequence is repeated and when a reverse current is detected by the comparator 131 of the reverse current detection circuit 130, again output RC of the flip flop 134 goes high and the reset state of the reverse current prevention holding circuit 140 remains cancelled, so that through a next clock CK generated by the one-shot pulse generating circuit 132, the counter of the reverse current prevention holding circuit 140 counts up (time t7).

After that, the above operation sequence is repeated and the counter of the reverse current prevention holding circuit 140 reaches a prescribed value ("4" in this embodiment), output CO of the reverse current prevention holding circuit 140 goes high (time t8). As a consequence, output of the NAND gate 114 is low only while output RC of the flip flop 134 is high and the AND gate 115 shuts off PWM pulse Ppwm, so that gate signal GN of the low-side switching device SW2 goes low and SW2 is forced to turn Off only during period T3 as indicated by the hatching in FIG. 2, thereby preventing a reverse current from the node NO from flowing to the ground and reducing power loss.

Then, at time t9, as output current Iout suddenly increases for such a reason that the CPU exits the sleep mode and returns to the normal mode, output voltage Vo goes down. Accordingly, the pulse width of PWM control pulse Ppwm becomes narrower; the On time of the high-side switching device SW1 increases and the On time of the low-side switching device SW2 decreases; and current IL which flows in the coil increases (period T5). In this state, as the low-side switching device SW2 turns On, a current flows from the ground to the coil, no reverse current flows and potential VLX of the node NO does not exceed reference voltage Vref2.

Therefore, the comparator 131 of the reverse current detection circuit 130 remains low; as indicated by broken line A, output RC (Q1) of the flip flop 134 does not go high; when a clock CK is generated, output Q2 of the flip flop 135 goes low; and its inverted signal goes high, which resets the reverse current prevention holding circuit 140 (time t10).

As mentioned above, in the switching regulator according to this embodiment, if a reverse current is detected, the reverse current prevention function works not immediately but a while after. This offers an advantage that the time for output voltage Vo to reach target output voltage E0 is shortened, whether output voltage Vo becomes lower than upper limit output voltage E1 or higher than upper limit output voltage E1 when it is higher than target output voltage E0.

In addition, in the switching regulator according to this embodiment, even if the reverse current prevention function works under a light load condition, the high-side switching device SW1 turns On in the same cyclic manner as before and in period T4 as shown in FIG. 2, output RC (Q1) of the RS flip flop 134 goes low and output of the NAND gate 114 goes high, which opens the AND gate 115 and thus turns On the low-side or synchronous rectification switching device SW2. Therefore, if a forward current flows through the inductor L1 at this moment, a forward current going from the grounding point to L1 flows in the synchronous rectification switching device SW2. As a consequence, when the reverse current prevention function is working, a current flow through a parasitic diode in the synchronous rectification switching device SW2 is prevented, thereby reducing power loss.

Figure 7A:
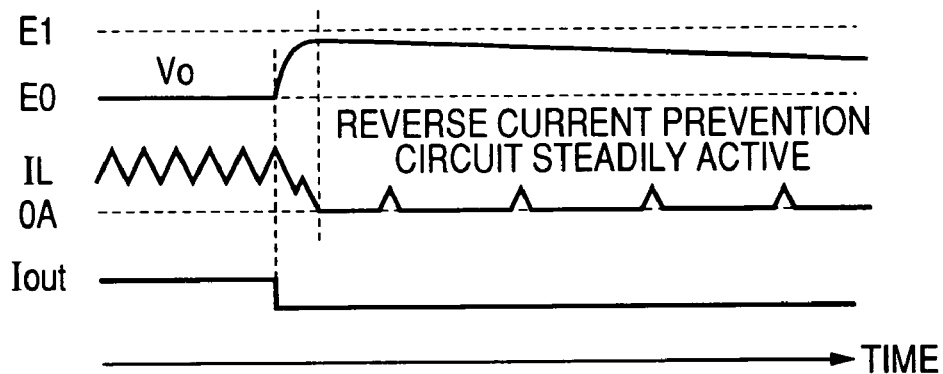
Figure 7B:
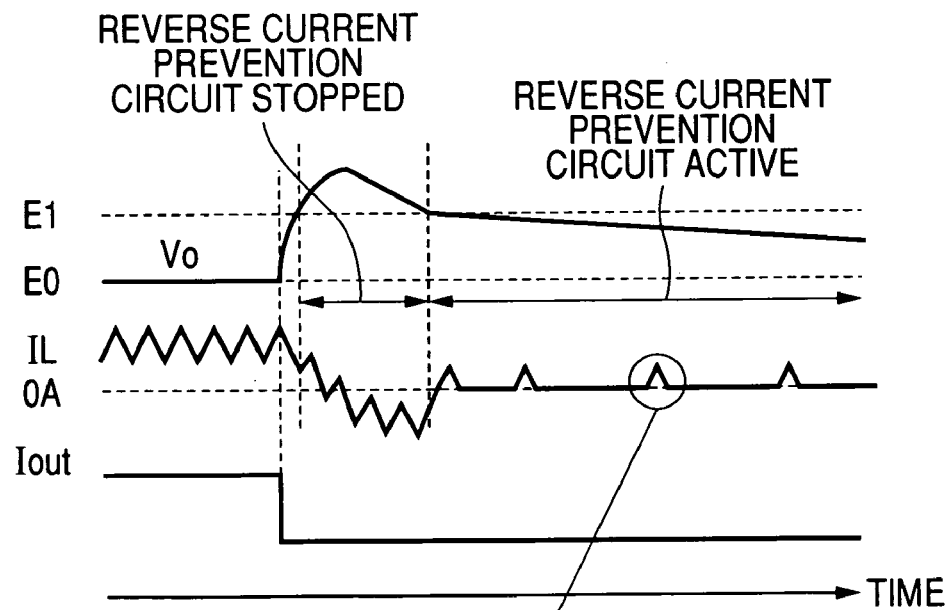
Figure 7C:

In the reverse current prevention circuit disclosed in Patent Document 2, since the low-side or synchronous rectification switching device is completely Off while the reverse current prevention function is working, as illustrated in FIG. 7(C) in enlarged form, current IL in the coil increases as the high-side switching device turns On and even when it turns Off later, the current, which still tries to flow in the coil, flows through the parasitic body diode in the synchronous rectification switching device and gradually decreases, resulting in power loss as indicated by the hatching in FIG. 7(C). By contrast, in the switching regulator according to this embodiment, in period Ta in the waveform shown in FIG. 8(C) in enlarged form, the high-side switching device SW1 is On and in period Tb (period T4 in FIG. 2) the low-side switching device SW2 is On and thus power loss caused by a current flow through the parasitic diode in SW2 is eliminated.

In the switching regulator according to this embodiment, even when the load becomes lighter and output current Iout decreases, if the corresponding period is short, the reset state of the reverse current prevention holding circuit (counter) 140 is cancelled and it starts counting and if the load becomes heavier and output current Iout increases before the counter reaches a prescribed value, the reverse current prevention holding circuit 140 is reset and the normal operation state is restored before the reverse current prevention function works.

Figure 3:
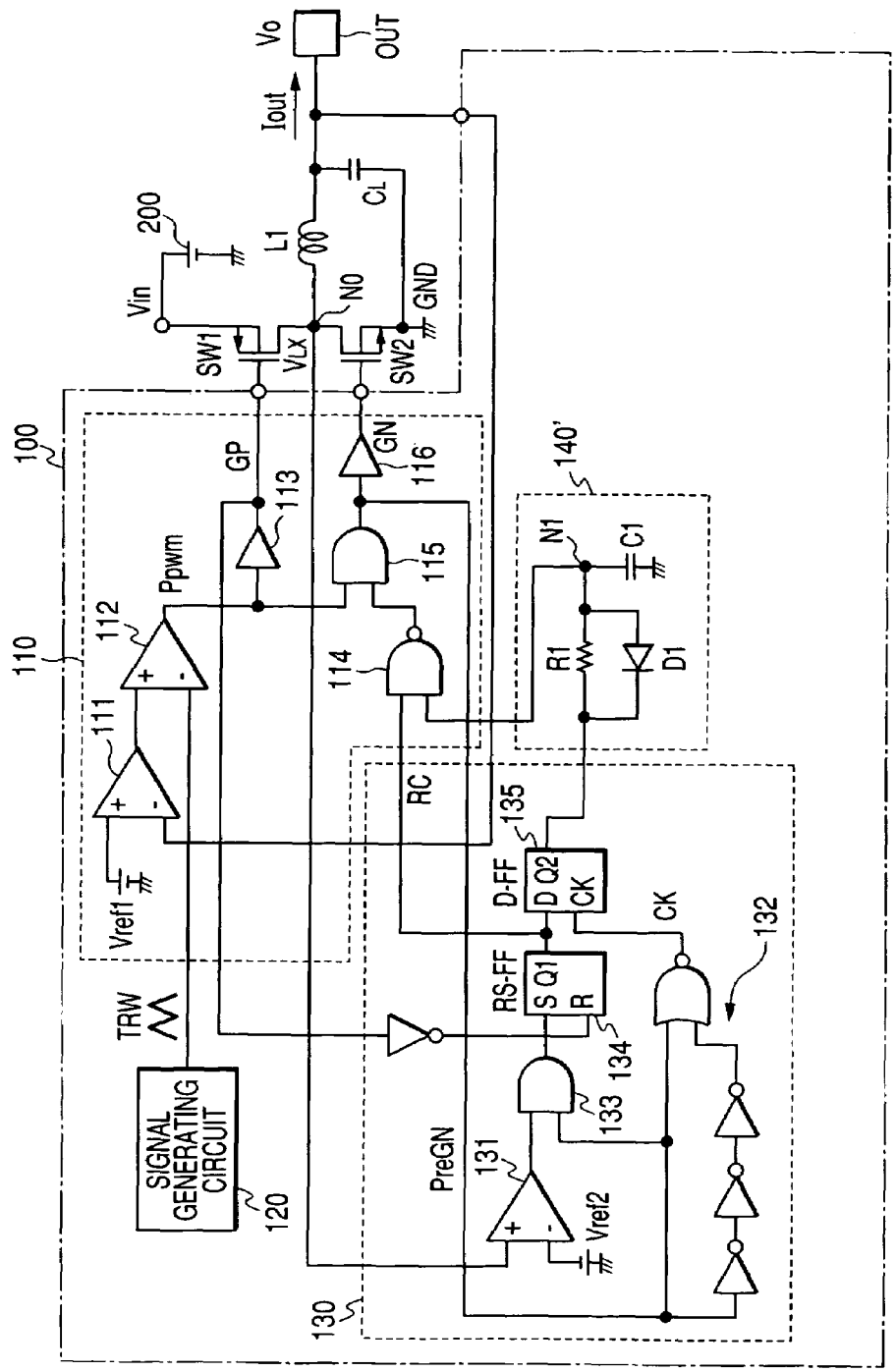
FIG. 3 is a block diagram showing the circuit configuration of a step-down switching regulator according to a second embodiment of the present invention.

FIG. 3 shows a semiconductor integrated circuit for controlling power supply according to a second embodiment of the present invention. In FIG. 3, the same circuits and devices as those in FIG. 1 are designated with the same reference numerals and their descriptions are omitted.

In the semiconductor integrated circuit for controlling power supply according to this embodiment, a time constant circuit (timer circuit) 140' consisting of a resistor R1 and a capacitor C1 is provided instead of the counter circuit as the reverse current prevention holding circuit 140 in the first embodiment. This time constant circuit 140' is designed as follows: when the reverse current detection circuit 130 (previous stage) detects a reverse current and output Q2 of the flip flop 135 (final step) goes high, charge is injected through the resistor R1 into the capacitor C1 and the potential of node N1 of connection of R1 and C1 gradually rises; when it exceeds a logical threshold for the NAND gate 114, output of the NAND gate 114 changes. Consequently, as in the counter circuit in the first embodiment, a prescribed time after the reverse current detection circuit 130 detects a reverse current, output of the NAND gate 114 goes low and PWM control pulse is not supplied to the gate terminal of the low-side switching device SW2, so that the reverse current prevention function works.

The time constant circuit 140' has a clamp diode D1 which is connected in parallel with the resistor R1 to prevent the potential of the node N1 from becoming too high. This diode D1 works so that when output Q2 of the flip flop 135 goes low, the charge is removed from capacitor C1, the potential of the node N1 rapidly goes down to the threshold voltage of the diode and thus the reverse current prevention function quickly stops working.

Figure 4:
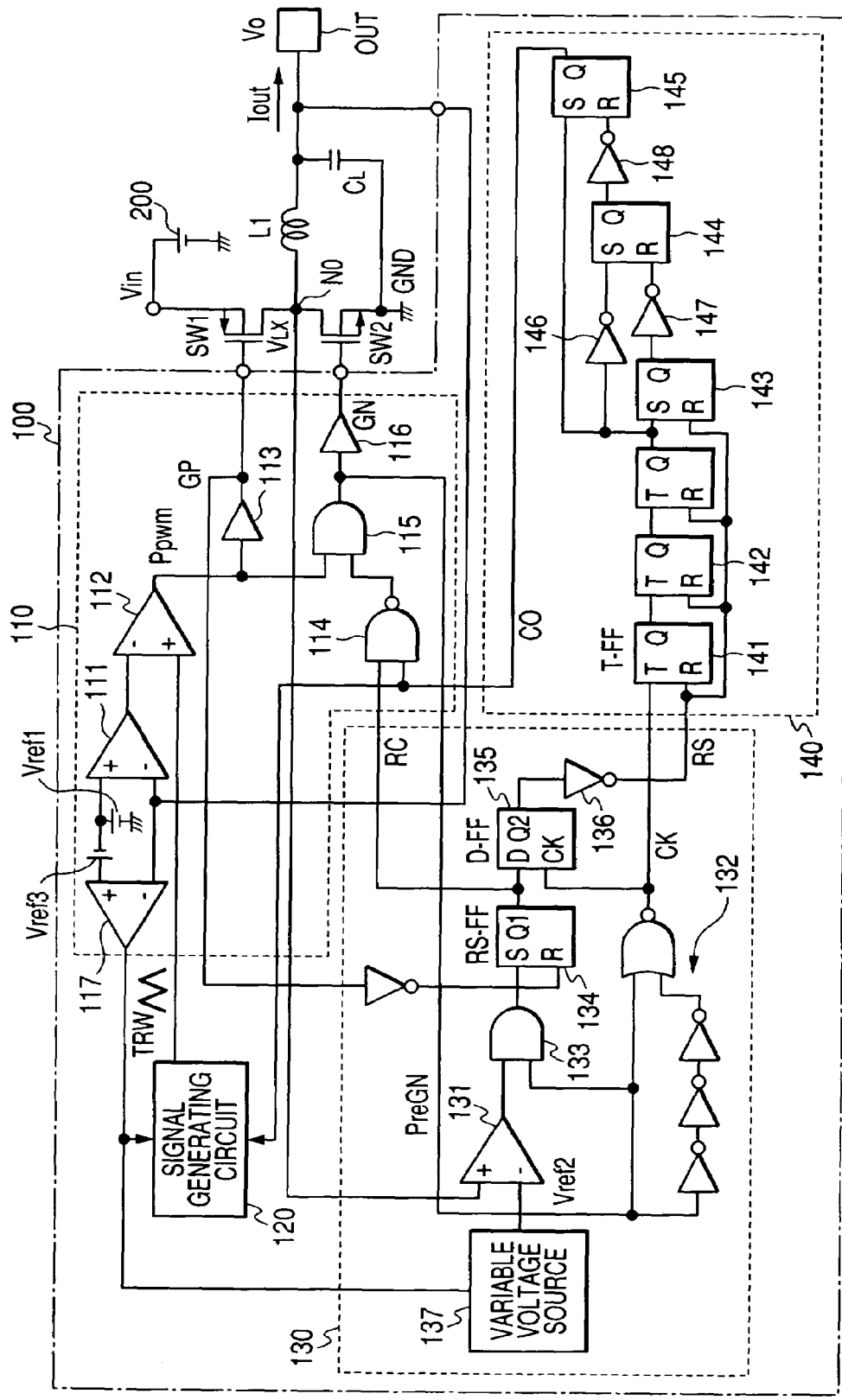
FIG. 4 is a block diagram showing the circuit configuration of a step-down switching regulator according to a third embodiment of the present invention.

FIG. 4 shows a semiconductor integrated circuit for controlling power supply according to a third embodiment of the present invention. In FIG. 4, the same circuits and devices as those in FIG. 1 are designated with the same reference numerals and their descriptions are omitted.

The semiconductor integrated circuit for controlling power supply according to this embodiment includes a variable voltage circuit 137 which makes reference voltage Vref2 of the reverse current detection comparator 131 in the first embodiment variable, and an overvoltage detection circuit 117 which consists of an error amplifier for detecting that the regulator's output voltage Vo becomes higher than a prescribed upper limit voltage Vref3, so that the reference voltage Vref2 changes when an overvoltage is detected. Concretely, if output voltage Vo becomes higher than the prescribed upper limit voltage, the reference voltage Vref2 is slightly increased so as to delay detection of a reverse current by the reverse current detection circuit 130 and allow some reverse current to flow through the low-side switching device SW2.

This makes it possible to draw the current in the coil toward the ground and make output voltage Vo closer to the target voltage quickly when output voltage Vo rises for some reason after the counter or timer of the reverse current prevention holding circuit 140 counts a prescribed time and the reverse current prevention function is activated.

In some types of conventional regulator with an overvoltage detection circuit, when an overvoltage is detected, the high-side switching device turns Off and the low-side switching device is forced to turn On. However, this system experienced the following problem: in some cases the low-side switching device breaks down because a large current flows continuously for a long time, and in other cases, since there is no limitation on reverse current and a large reverse current flows and at the instant that the synchronous rectification switching device turns Off, a large current returns to an input power supply due to a regenerative current in the inductor and if the input power supply has no sink capacity, the voltage rises and exceeds the withstand voltage of the device in use and destroys the device.

According to this embodiment, even when the output voltage is higher than the upper limit voltage, simply the reverse current detection voltage is changed and for a while after detection of a reverse current, switching control continues before the reverse current prevention circuit starts working, so that a large current can not flow to the input power supply and there is no chance of destroying the switching device. In this embodiment, when the overvoltage detection circuit 117 detects an overvoltage, a detection signal is sent to the signal generating circuit 120 to stop triangular wave generation or output. This ensures that period Td in FIG. 8, a period during which coil current IL is 0, is created.

Figure 8A:
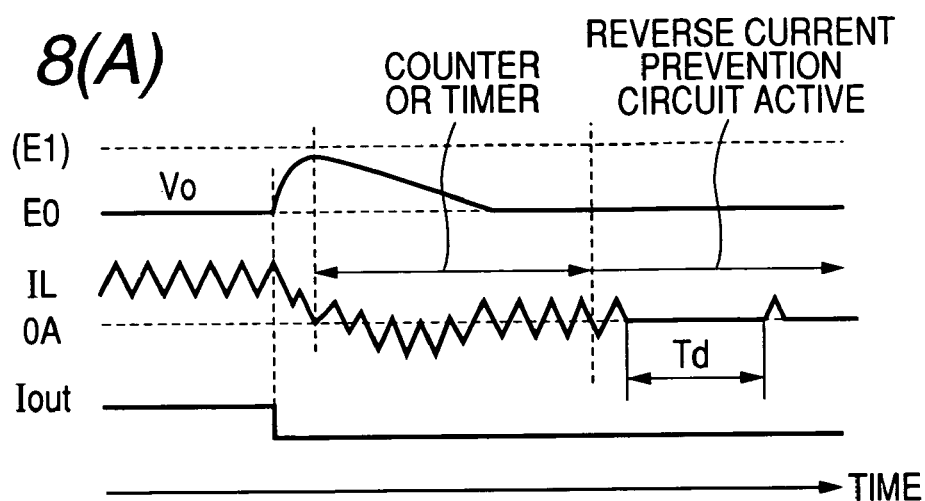
Figure 8B:
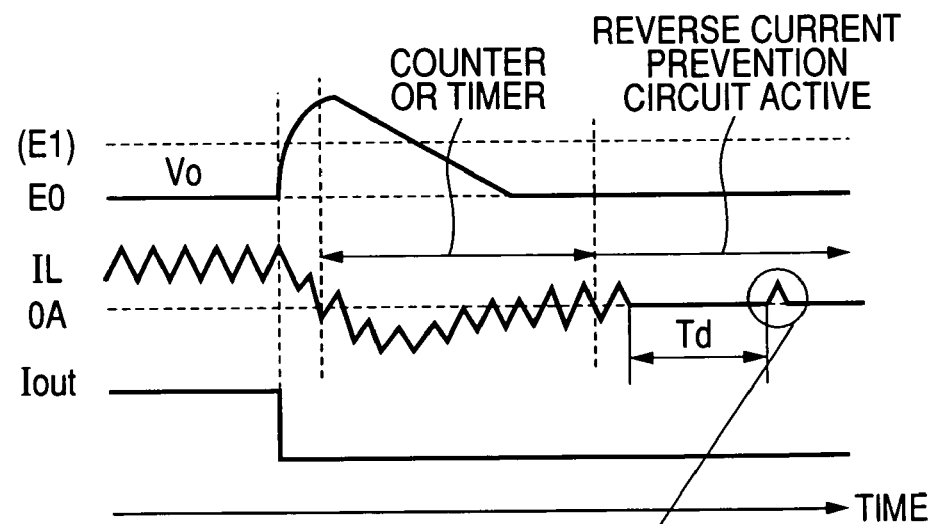
Figure 8C:
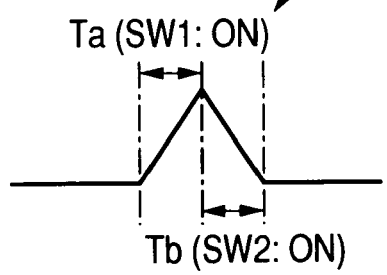

FIG. 8 is a timing diagram for a case that the reverse current prevention function is activated after the counter of the reverse current prevention holding circuit 140 counts eight clocks CK. The number of clocks here is not fixed but should be determined depending on the configuration of the regulator according to this embodiment or the specification of the system concerned.

Figure 5:
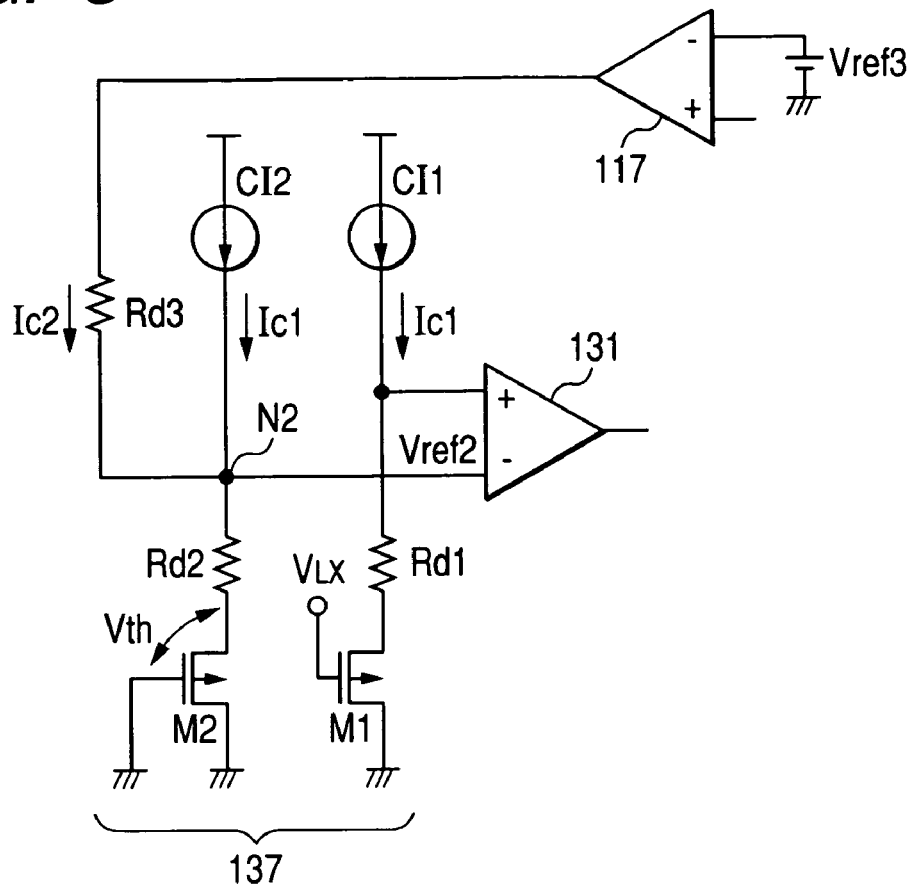
FIG. 5 is a block diagram showing a concrete example of a variable voltage circuit in a reverse current detection circuit in the third embodiment.
Figure 6:
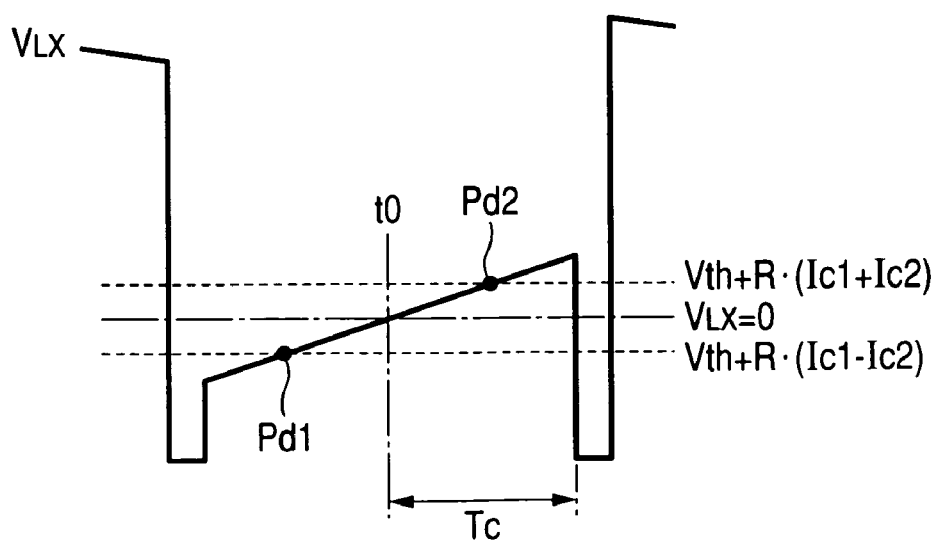
FIG. 6 is a waveform diagram showing the relation between change in potential VLX of a coil connection node monitored by the reverse current detection circuit and reference voltage Vref2 as output of the variable voltage circuit.

FIG. 5 shows a concrete example of the variable voltage circuit 137 and FIG. 6 shows the relation between change in potential VLX of the coil connection node NO monitored by the reverse current detection circuit 130 and reference voltage Vref2 as output of the variable voltage circuit 137.

The variable voltage circuit 137 as shown in FIG. 5 includes: a MOS transistor M1 to the gate terminal of which potential VLS of the coil connection node NO is applied; a resistor Rd1 and a constant current source CI1 which are connected in series with the transistor M1; a MOS transistor M2 to the gate terminal of which a ground potential is applied; and a resistor Rd2 and a constant current source CI2 which are connected in series with the transistor M2, where the output terminal of the overvoltage detection circuit 117 is connected through a resistor Rd3 to a node N2 of connection of the resistor Rd2 and constant current source CI2. The same current Ic1 flows through the constant current sources CI1 and CI2.

In this variable voltage circuit 137, in a normal state in which the regulator's output voltage Vo is close to the target voltage, reference voltage Vref2 as expressed below is given to the comparator 131:

$$Vth+R\cdot(Ic1-Ic2)$$

where Vth denotes the threshold voltage for the MOS transistors M1, M2, R the resistance value for the resistors Rd1, Rd2, and Ic2 the current which flows through the resistor Rd3. When the regulator output voltage Vo exceeds the upper limit voltage, reference voltage Vref2 as expressed below is given to the comparator 131:

$$Vth+R\cdot(Ic1+Ic2)$$

Therefore, in the normal state, taking a detection delay into consideration, a reference voltage as expressed by Vref2=Vth+R·(Ic1−Ic2) is supplied so that detection point Pd1 is earlier than time t0 when potential VLX of the coil connection node NO becomes "0", whereas a reference voltage as expressed by Vref2=Vth+R·(Ic1+Ic2) is supplied so that detection point Pd2 through the variable voltage circuit 137 is later than time t0 when potential VLX becomes "0". As a consequence, in an overvoltage state, some reverse current is allowed to flow through the low-side switching device SW2 and the coil current is drawn toward the ground to bring output voltage Vo close to the target voltage quickly. In FIG. 6, period Tc is a period during which a reverse current flows through the switching device SW2.

The embodiment as shown in FIG. 4 may also be in another form that the pulse generating circuit 133, flip flop 135, reverse current prevention holding circuit 140 and NAND gate 114 are omitted and the AND gate 115 is controlled directly by output of the flip flop 134 of the reverse current detection circuit 130.

The invention made by the present inventors has been so far explained concretely in reference to preferred embodiments thereof. However, the invention is not limited to the above embodiments and it is obvious that it may be modified in various ways without departing from the spirit and scope thereof. For example, in the explanation of the above embodiments, it is stated that the switching control circuit 110 performs PWM drive control which changes the control pulse duty ratio using a triangular wave signal with a prescribed frequency; however, the control method of the switching control circuit 110 is not limited to PWM control but may be a method whereby the time of fall and rise of a control signal for the switching devices SW1 and SW2 varies depending on output voltage.

Furthermore, the variable voltage circuit 137 in the third embodiment is not limited to the one shown in FIG. 5; instead, it may be an adder-subtractor circuit which consists of an operational amplifier and a resistor and outputs, as reference voltage Vref2, a voltage depending on the difference between the voltage from the error amplifier 117 and the reference voltage Vref from the reference voltage circuit.

Besides, in the above embodiments, when the reverse current detection circuit 130 detects a reverse current, PWM control pulse to be supplied from the switching control circuit 110 to the gate terminal of the switching device SW2 on the ground side is shut off by the AND gate 115 or the like to prevent the switching device SW2 from turning On. Instead, a pull-down switch may be provided between the gate terminal of the switching device SW2 and the grounding point to force the gate voltage to go down to the ground potential and thereby turn Off the switching device SW2.

In the above embodiments, potential VLX of the node NO connected with the coil is compared with the reference voltage Vref2 to detect a reverse current. Instead, a comparator which compares the voltages at both ends (between the source and drain terminals) of the switching device SW2 may be provided to detect a reverse current.

The above explanation is based on the assumption that the invention made by the present inventors is applied to a step-down switching regulator in the industrial field of utilization to which the invention pertains. However, it may be widely applied to step-up and step up/down synchronous rectification switching regulators and so on.

What is claimed is:

1. A semiconductor integrated circuit for controlling power supply, which turns On and Off in a complementary manner a first switching element and a second switching element coupled serially between a voltage input terminal and a reference potential terminal and supplies an electric current to an inductor coupled between a node of connection of the first and second switching elements and an output terminal to convert the voltage applied to the voltage input terminal and outputs the converted voltage, the integrated circuit having:
a light load detection circuit for detecting a light load condition; and
a reverse current prevention function which, when the detection circuit detects the light load condition, prevents the second switching element from turning On in a period when the second switching element should turn On,
wherein, even when the light load detection circuit detects the light load condition, the first and second switching elements are turned On and Off in a complementary manner as many times as prescribed after a detection of the light load condition.

2. A semiconductor integrated circuit for controlling power supply, which turns On and Off in a complementary manner a first switching element and a second switching element coupled serially between a voltage input terminal and a reference potential terminal and supplies an electric current to an inductor coupled between a node of connection of the first and second switching elements and an output terminal to convert the voltage applied to the voltage input terminal and outputs the converted voltage, the integrated circuit having:
a light load detection circuit for detecting a light load condition; and
a reverse current prevention function which, when the detection circuit detects the light load condition, prevents the second switching element from turning On in a period when the second switching element should turn On,
wherein, even when the light load detection circuit detects the light load condition, the first and second switching elements are turned On and Off in a complementary manner within a prescribed time after a detection of the light load condition.

3. The semiconductor integrated circuit for controlling power supply according to claim 1, wherein the light load detection circuit compares a voltage of the node of connection of the first switching device and the second switching element with a first prescribed voltage to detect the light load condition.

4. The semiconductor integrated circuit for controlling power supply according to claim 3, wherein the light load detection circuit detects a reverse current condition in the second switching element based on the result of comparing the voltage of the node of connection with the first prescribed voltage while the first switching element is Off.

5. The semiconductor integrated circuit for controlling power supply according to claim 4, further comprising an overload detection circuit which compares an output voltage with a second prescribed voltage to detect an overvoltage condition, wherein, when the overvoltage detection circuit detects the overvoltage condition, the second prescribed voltage is changed to delay detection of a light load condition by the light load detection circuit.

6. The semiconductor integrated circuit for controlling power supply according to claim 1, further comprising:
 a pulse generating circuit which detects a rising edge or a falling edge of a signal for turning On or Off the second switching element and generates a pulse; and
 a counter circuit which counts pulses generated by the pulse generating circuit,
 wherein the counter circuit counts as many times as prescribed after a detection of a light load condition.

7. The semiconductor integrated circuit for controlling power supply according to claim 6, wherein the counter circuit is reset when the light load detection circuit no longer detects a light load condition.

8. The semiconductor integrated circuit for controlling power supply according to claim 2, further comprising:
 a flip flop which holds a result of detection by the light load detection circuit; and
 a time constant circuit which is connected with an output terminal of the flip flop,
 wherein the time constant circuit counts a prescribed time period after the detection of a light load condition.

9. An electronic component for power supply comprising a semiconductor integrated circuit for controlling power supply according to claim 1, the first switching element and second switching element which are turned On and Off by a control signal sent from the semiconductor integrated circuit for controlling power supply, an inductor one terminal of which is connected with the node of connection of these switching devices, and a capacitor which is connected between the other terminal of the inductor and a constant potential point are mounted on a single insulating substrate,
 wherein the voltage input terminal is located on the insulating substrate.

10. A power supply device comprising an electronic component for power supply according to claim 9 and a direct current power supply connected with the voltage input terminal.

* * * * *